United States Patent [19]

Geeck, III

[11] Patent Number: 4,954,031
[45] Date of Patent: Sep. 4, 1990

[54] TIE RAIL CONSTRUCTIONS

[76] Inventor: Joseph S. Geeck, III, 701 Roseland Pkwy., Harahan, La. 70123

[21] Appl. No.: 351,381

[22] Filed: May 15, 1989

Related U.S. Application Data

[63] Continuation-in-part Ser. No. 240,849, Sept. 6, 1988.

[51] Int. Cl.$^5$ .............................................. B61D 45/00
[52] U.S. Cl. .................................. 410/110; 410/115; 410/116
[58] Field of Search ............... 410/116, 108, 99, 96, 410/101, 104, 102, 107, 105, 106, 110, 115; 296/41, 50, 32, 36; D8/354, 356, 363, 366

[56] References Cited

U.S. PATENT DOCUMENTS 4,253,785  3/1981  Bronstein ........................... 410/115
4,650,382  3/1987  Johnson ............................. 410/115

FOREIGN PATENT DOCUMENTS 0634656  1/1962  Canada ............................... 410/108

Primary Examiner—Robert P. Olszewski
Assistant Examiner—Mark T. Le
Attorney, Agent, or Firm—John F. Sieberth

[57] ABSTRACT

A device for use on pickup trucks, boats and other similar vehicles in fastening, tying down or securing covers, cargo or other objects by means of straps or cords. The device is composed of a linear body, one flat portion of which can be fastened to the top of the truckbed sidewall of a pickup truck or to the top of its tail gate or to the top of the gunwales of a boat. Another portion of the device extends outwardly from the vehicle and serves as point(s) of attachment for the straps or cords. The device is shaped so that the place(s) where the straps or cords are fastened is/are no higher than the horizontal plane or planes occupied by the top of the flat portion of the device.

20 Claims, 2 Drawing Sheets

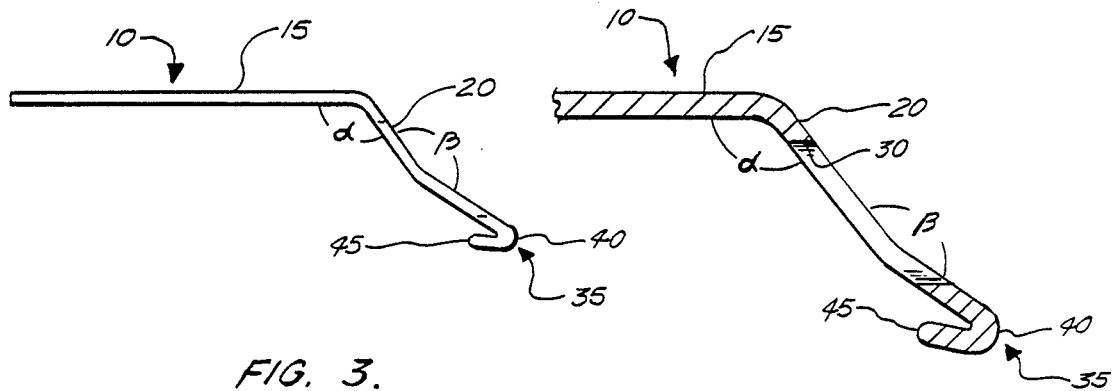
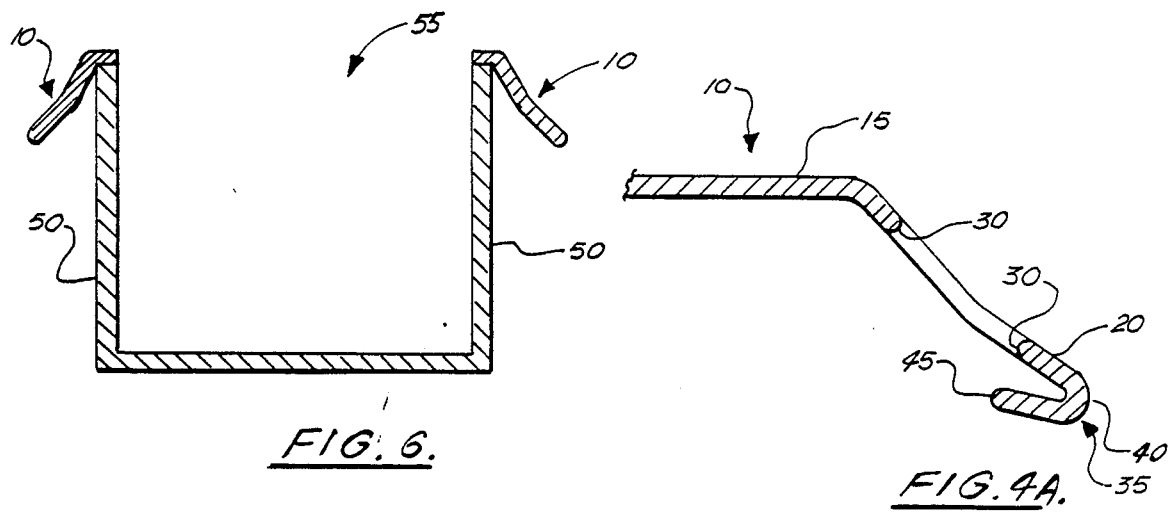
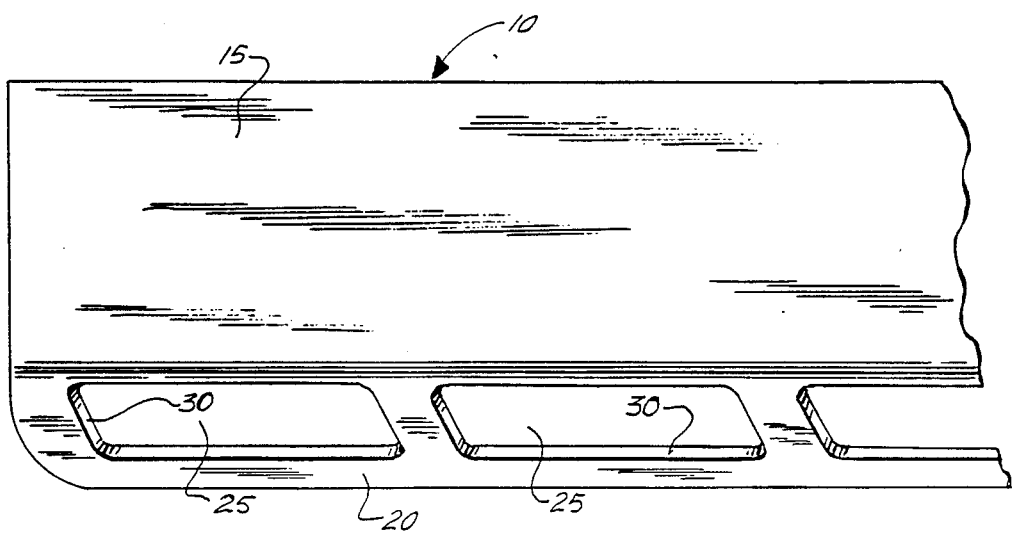

TIE RAIL CONSTRUCTIONS

REFERENCE TO RELATED APPLICATION

This application is a continuation-in-part of prior copending application Ser. No. 240,849, filed Sept. 6, 1988.

TECHNICAL FIELD

This invention relates to devices used on pickup trucks, boats and other similar vehicles wherein it is desired or necessary to fasten, tie down or secure covers, cargo or other relatively large objects by means of straps, cords, or the like. In the case of pickup trucks, such devices are attached to the upper sides of the trucks adjacent the truck bed, and may also be attached to the top of the tail gate. In the case of boats, these devices are attached to tops of the gunwales, for example near the bow of the boat or to the rear near the transom. Such devices are also referred to variously as side rails or bed rails.

SUMMARY OF THE INVENTION

The tie rails of this invention are composed of a linear body having (a) detachable attachment means for receiving at least one flexible tying member—and preferably a plurality of flexible tying members—to enable such member or members to be detachably secured to the linear body, and (b) mounting means for fastening the linear body to the top of a sidewall of a pickup truck adjacent the truck bed, to the top of a tail gate of a pickup truck, or to the top of a gunwale of a boat, the detachable attachment means being (i) laterally offset from the mounting means and (ii) disposed relative to the mounting means such that when the linear body is so fastened, the locus of the detachable attachment means is no higher than the horizontal plane or planes occupied by the top of the mounting means. Most preferably the detachable attachment means are disposed relative to the mounting means such that when the linear body is fastened in place atop the truckbed sidewall, the tail gate, or the gunwale, not only is each detachable detachment means offset outwardly from the sidewall, tail gate or gunwale, but additionally the locus of the detachable attachment means is below the horizontal plane or planes occupied by the top of the mounting means. Thus the tie rails of this invention do not extend upwardly from the sidewall, tail gate or gunwale. Moreover the locus of the detachable attachments are not higher than, let alone directly above, the sidewall, tail gate or gunwale.

In preferred form the linear body is composed of an elogate member bent at an obtuse angle along its linear midportion thereby defining a pair of relatively narrow flat linear sections. One such section ("first section") is of a width sufficient to lie flat atop the surface to which it is to be fastened (sidewall, tail gate, gunwale, etc.) and thus serves as the mounting means. The other section ("second section" constituting the detachable attachment means) extends downwardly and outwardly at an obtuse angle from the first section and has along its its length a plurality of apertures sized, shaped and positioned to receive a flexible tying member such as a strap or cord so that the tying member can be detachably attached as by means of a suitable knot, clamp or other appropriate fastener. In a particularly preferred embodiment the walls of the second section defining such apertures are convex in cross-section so that the tying member encounters no sharp edges at the locus of detachable attachment. In another particularly preferred embodiment the outermost portion of the second section is bent back upon or toward itself (most preferably at an acute angle) so that it extends upwardly and inwardly in the general direction of the underside of the first section. It is especially preferred to provide a rounded or convex edge along this upwardly and inwardly extending portion of the second section.

Various means may be used for fastening the body itself to the surface on which it is to be mounted. For example it may be bonded to the mounting surface by means of a suitable adhesive, or it may be welded onto the mounting surface. Preferably however the body will be fastened to the mounting surface by means of machine screws, nuts and bolts, or like fasteners.

The body is preferably a unitary body fabricated from a suitably strong, weather-resistant material, such as aluminum or an aluminum alloy, anodized aluminum, titanium, chrome-plated or painted steel, or a tough plastic or composite substance such as fiberglass or fiber-reinforced carbon composites.

Among the advantageous features of this invention are that the tie rails utilize the wall on which they are mounted (sidewall, tail gate, gunwale) to protect both themselves and the detachable attachments of the tying members from physical damage, and they do not significantly increase the height of the wall on which they are mounted and thus facilitate side loading and unloading of cargo and allow tool boxes, truck bed covers or boat covers, etc. to rest on top of them without likelihood of damage occurring either to the tie rail or to the superposed secured tool box, cover or other item. In addition the tie rails of this invention are easy to install and use.

Other features and embodiments of this invention will be still further apparent from the ensuing description, appended claims and accompanying drawings.

THE DRAWINGS

FIG. 3 is an end view of the embodiments of a tie rail for pick-up trucks, boats or the like shown in FIGS. 1, 2, 2A and 2B.

FIG. 4 is a sectional view of one embodiment taken along line 4—4 of FIGS. 1, 2, 2A and 2B.

FIG. 4A is a sectional view of another embodiment taken along line 4—4 of FIGS. 1, 2, 2A and 2B, and differing from the embodiment shown in FIG. 4 only in the contour of upper and lower edges defining the open spaces therein.

FIG. 5 is a top view, shown fragmentally to indicate indeterminate length, of the embodiment shown in FIGS. 1 and 1A.

FIG. 6 is a schematic cross section of a pair of spaced apart upstanding linear walls of a vehicle which define the edges of a cargo space, each such wall having affixed thereto a tie down device such as depicted in any of FIGS. 1, 2, 2A, 2B, 3, 4, 4A and 5.

DESCRIPTION OF PREFERRED EMBODIMENTS OF THE DRAWINGS

Turning now to the Drawings wherein like numerals represent like parts among the several Figures, elongate unitary body 10 includes a top section 15 and a side section 20. Section 15 rests flat atop a mounting surface (not shown) such as the upper surface of a pickup truck sidewall or tailgate, or gunwale of a boat. As indicated above, body 10 is mounted onto the mounting surface by application of an adhesive between the underside of top section 15 and the underlying mounting surface, or by welding these parts together, or by use of screws or bolts extending through top section 15 and into (in the case of screws) or through (in the case of bolts) the mounting surface, a nut being used to secure the bolt on the underside of the mounting surface through which it protrudes.

Side section 20 extends downwardly and outwardly at an obtuse angle alpha from top section 15 and the upper surface of the mounting surface to which the body is fastened, and in the particularly preferred form depicted, side section 20 flares outwardly at an obtuse angle beta along its median portion (note especially FIGS. 3, 4 and 4A). Side section 20 contains a plurality of apertures 25 adapted to receive one or more flexible tying members (not shown) such as a strap or belt or cord and to enable such tying members to be detachably attached to side section 20 by means of knots, clamps or other suitable fasteners. The preferred outwardly flared configuration of the lower portion of side section 20 facilitates the detachable attachment and detachment of the tying means to and from the tie rail.

Figure 1:
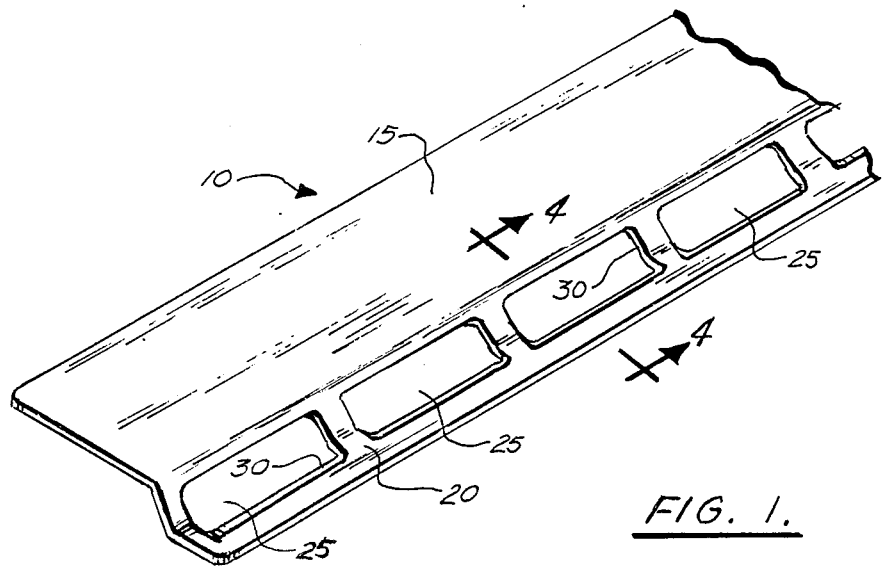
FIG. 1 is a perspective view of one embodiment of a tie rail for pick-up trucks, boats or the like embodying this invention, shown fragmentally to indicate indeterminate length.
Figure 2:
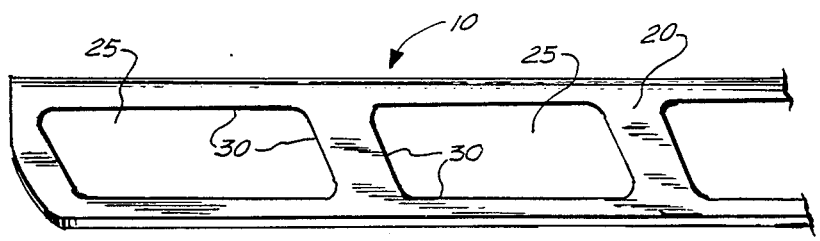
FIG. 2 is a side view of the tie rail of FIG. 1, shown fragmentally to indicate indeterminate length.
Figure 2A:
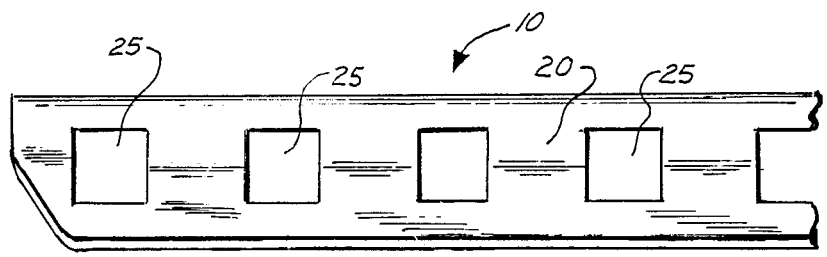
FIG. 2A is a side view of another embodiment of a tie rail for pick-up trucks, boats or the like embodying this invention, shown fragmentally to indicate indeterminate length, and differing from the embodiment shown in FIGS. 1 and 2 only in the shape and spacing of the open spaces therein.
Figure 2B:
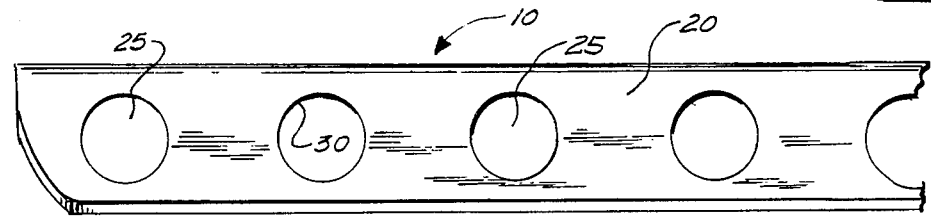
FIG. 2B is a side view of another embodiment of a tie rail for pick-up trucks, boats or the like embodying this invention, shown fragmentally to indicate indeterminate length, and differing from the embodiments shown in FIGS. 1, 2 and 2A only in the shape and spacing of the open spaces therein.

As indicated by FIGS. 2, 2A and 2B apertures 25 may be of varying shapes, sizes, and configurations. Also the spacing between apertures 25 may be varied to suit the needs of the occasion.

FIG. 4A illustrates an especially preferred embodiment in which the walls 30 defining the respective apertures 25 are convex in cross-section (as shown) as this eliminates the possibility of the tying member being frayed or cut by contact with a sharp edge at the locus of detachable attachment between the tying member and the tie rail.

For best results, angle alpha falls within the range of about 100° to about 170°, and angle beta falls within the range of about 100° to about 175°. However departures from these ranges are feasible and may be used if desired.

FIGS. 3, 4 and 4A illustrate another particularly preferred embodiment wherein the outermost portion 35 of the outwardly flared portion of side section 20 is bent back upon or toward itself (most preferably at an acute angle such as depicted) so that portion 35 extends upwardly and inwardly in the general direction of the underside of top section 15. Such construction enhances the rigidity of side section 20 and provides a rounded surface 40 facing downwardly and outwardly. As FIGS. 3, 4 and 4A also depict, it is especially preferred to provide a rounded or convex edge 45 on and along portion 35 so that the user is exposed to no sharp edges when tying or untying or otherwise fastening or unfastening the flexible tying members.

When used atop the truckbed sidewalls of a pickup truck, one or more devices of this invention are fastened to the top of each of the respective sidewalls. Such an arrangement is depicted schematically in FIG. 6 which shows a pair of tie down devices 10,10 affixed to the respective upstanding linear walls 50,50 defining a cargo space 55. Usually one such elongate device is mounted atop the sidewall on either side of the vehicle, but a plurality of such devices may be longitudinally aligned along the respective sidewall tops if desired.

While the tie rails of this invention are preferably composed of a unitary body of the types depicted, they can of course be fabricated from a plurality of parts which have been suitably joined together to form the device. These and other variants will likely occur to those skilled in art upon a consideration of the present disclosure.

Since this invention is susceptible to considerable variation in its practice, it is not intended that it be limited by the foregoing description. Rather, this invention is intended to fall within the spirit and scope of the ensuing claims.

I claim:

1. A tie down device for attachment to the top of an upstanding linear wall, which device comprises:
   (1) a linear top section adapted to be fastened longitudinally onto the top of said linear wall; and
   (2) a linear side section depending from said top section such that when said top section is fastened longitudinally onto the top of said wall, the side section extends downwardly and outwardly at an obtuse angle alpha from the top section, said side section being further characterized in that:
      (a) said side section flares outwardly at an obtuse angle beta along its median portion to thereby form
         (i) a linear upper portion immediately adjacent said top section and
         (ii) a linear lower portion spaced from said top section by said linear upper portion, said linear upper portion and said lower portion being in a non-planar relationship; and
      (b) said side section contains a plurality of linearly disposed apertures adapted to receive at least one flexible tying member, said apertures being linearly disposed at least in part in said linear lower portion.

2. A device as claimed in claim 1 wherein said side section is still further characterized in that the outermost portion of said linear lower portion is bent back upon itself.

3. A device as claimed in claim 1 wherein said side section is still further characterized in that the outermost portion of said linear lower portion is bent back toward itself at an acute angle and provides a rounded surface facing downwardly and outwardly.

4. A device as claimed in claim 1 wherein said side section is still further characterized in that (i) the outermost portion of said linear lower portion is bent back toward itself at an acute angle and provides a rounded surface facing downwardly and outwardly and (ii) the bent back portion of said outermost portion terminates with an edge that is rounded or convex in cross-section.

5. A device as claimed in claim 4 wherein said edge faces upwardly and inwardly.

6. A device of claim 1 wherein angle alpha falls within the range of about 100° to about 170°.

7. A device of claim 1 wherein angle beta falls within the range of about 100° to about 175°.

8. A device of claim 1 wherein angle alpha falls within the range of about 100° to about 170° and wherein angle beta falls within the range of about 100° to about 175°.

9. A device of claim 1 wherein the walls defining said apertures are convex in cross-section.

10. In combination:
   (A) an upstanding linear wall, and
   (B) a tie down device comprising:
      (1) a linear top section fastened longitudinally onto the top of said linear wall; and
      (2) a linear side section depending downwardly and outwardly at an obtuse angle alpha from the top section, said side section being further characterized in that:
         (a) said side section flares outwardly at an obtuse angle beta along its median portion to thereby form
            (i) a linear upper portion immediately adjacent said top section and
            (ii) a linear lower portion spaced from said top section by said linear upper portion, said linear upper portion and said lower portion being in a non-planar relationship; and
         (b) said side section contains a plurality of linearly disposed apertures adapted to receive one or more flexible tying members, said apertures being linearly disposed at least in part in said linear lower portion.

11. A combination of claim 10 wherein the upstanding linear wall is a truckbed sidewall of a pickup truck.

12. A combination of claim 10 wherein the upstanding linear wall is a tailgate of a pickup truck.

13. A combination of claim 10 wherein the upstanding linear wall is a gunwale of a boat.

14. A combination of claim 10 wherein said side section is still further characterized in that the outermost portion of said linear lower portion is bent back upon itself.

15. A combination of claim 10 wherein said side section is still further characterized in that the outermost portion of said linear lower portion is bent back toward itself at an acute angle and provides a rounded surface facing downwardly and outwardly.

16. A combination of claim 10 wherein said side section is still further characterized in that (i) the outermost portion of said linear lower portion is bent back toward itself at an acute angle and provides a rounded surface facing downwardly and outwardly and (ii) the bent back portion of said outermost portion terminates with an edge that is rounded or convex in cross-section.

17. A combination of claim 16 wherein said edge faces upwardly and inwardly.

18. A vehicle having a pair of spaced-apart upstanding linear walls defining the edges of a cargo space, each such wall having affixed thereto a time down device comprising:
   (1) a linear top section fastened longitudinally onto the top of the linear wall to which the device is affixed; and
   (2) a linear side section depending downwardly and outwardly at an obtuse angle alpha from the top section, said side section being further characterized in that:
      (a) said side section flares outwardly at an obtuse angle beta along its median portion to thereby form
         (i) a linear upper portion immediately adjacent said top section and
         (ii) a linear lower portion spaced from said top section by said linear upper portion, said linear upper portion and said lower portion being in a non-planar relationship; and
      (b) said side section contains a plurality of linearly disposed apertures adapted to receive one or more flexible tying members, said apertures being linearly disposed at least in part in said linear lower portion.

19. A combination as claimed in claim 18 wherein each said side section is still further characterized in that the outermost portion of said linear lower portion is bent back upon itself.

20. A combination as claimed in claim 18 wherein each said side section is still further characterized in that the outermost portion of said linear lower portion is bent back toward itself at an acute angle and provides a rounded surface facing downwardly and outwardly.

* * * * *